8255X
L. Norcross.
Diving Armor.
Patented Jan. 14, 1834.
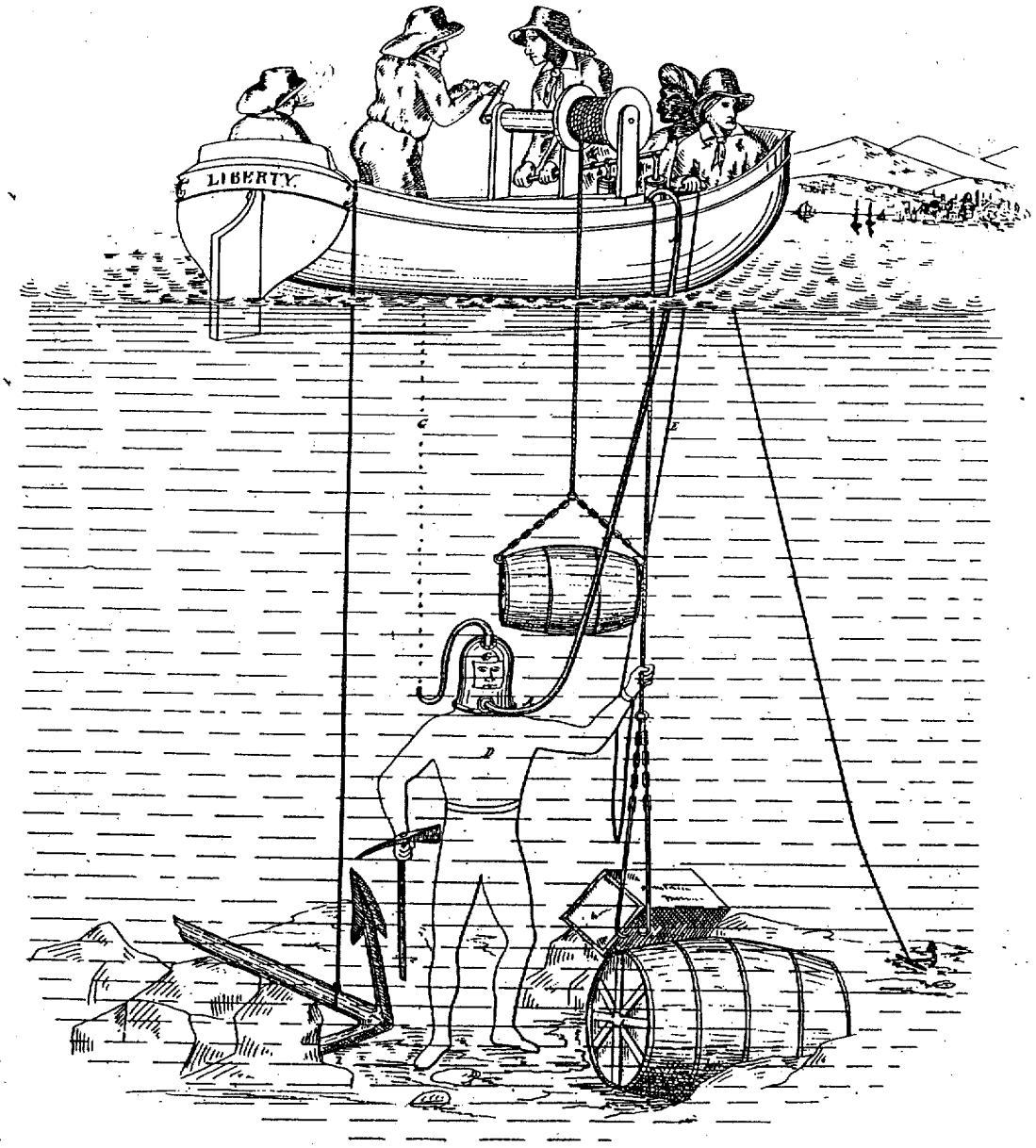

6/14/1834 8255x

June 14. 1834

53.

Leonard Norcross Dixfield Maine

Letters Patent June 14. 1834. 8255X

The Schedule referred to in these Letters Patent and making part of the
same containing a description in the words of the said Leonard Norcross
himself of his improvement in an impervious Elastic air refreshing
water Dress To all to whom these presents shall come.
Be it known that I Leonard Norcross of Dixfield in the County
of Oxford State of Maine have invented a new and useful improvement
in an impervious Elastic air refreshing Water dress. and that the follow
ing is a full and exact description of the construction of the invention and
operation as invented by me. Specification of my impervious Elas
tic Air refreshing Water dress. to be used in searching for and regaining
property lost in rivers bays harbours &c described in three parts.
1st The dress for the Body 2nd the Cap or covering for the head.
3rd the Breathing hose. 1st The dress for the body is composed of India
rubber. India Rubber cloth. Cloth ~~painted~~ or a suit garment of leath
er sized with india Rubber or painted with india Rubber paint and var
nished with Elastic varnish. and is formed to fit the feet legs. chest
shoulders arms and hands as close as may be and admit a dress of flan
nel under it and give the person who wears it ease of motion to walk,
stoop and to move the arms and hands. This may be made entirely whole
except an aperture at the neck to receive the head dress or cap, When
composed of materials less elastic than India Rubber it will be neces
sary to have a larger opening at the neck and folded on the back of the
neck to bring it close around the cap and is secured and made tight
as described in part 2nd. or the cap and upper part of the dress may
be made together and the upper and lower parts of the dress be brought
between two hoops around the waist which are pressed together by screw
bolts with nuts. the bolts passing through both hoops. Part 2nd. The
cap or head dress may be made of glass. leather. wood. or any suitable

[illegible]

8255X metallic substance. It should be of such a size as not to press upon any
part of the head and fitted to rest upon the shoulders. It should be round
at the neck with two projections around it near the lower part with
a groove or concave between them over which the dress is brought and
pressed into the groove by two half circles formed of copper or iron with
a joint in the fore part and closed and drawn tight by a screw be
hind. there must be a glass placed in the cap before the eyes when
not composed of that material of sufficient size to assist the sight
in the various discoveries — 3<sup></sup>d The breathing hose one will answer
in a small depth of water and must be of larger bore than when two
are used. They may be constructed similar to fire Engine hose. When
two are used one is termed the refresher, the other the discharger and are
of about half an inch bore. their length must be at least equal to the
depth of water in which they are used. The refresher is introduced through
cap or upper part of the dress so as to discharge the air against the mouth
and nostrils. The discharger must be introduced in as convenient a
position as may be to discharge or carry off the air which has been respired
they are coupled together from the cap upwards to their length and
should have a chain between them of sufficient size to counteract their
buoyancy & for other purposes. there must be a weight of heavy metal at-
tached to the dress and cap to counteract their buoyancy. The most
convenient manner of using this dress will be to have a cylinder of suffi-
cient size and length to wind the hose and chain upon attached
to the vessel boat or raft. the refresher passing from the surface of
the cylinder into the shaft of it near one end which must have a hole
in at the end coinciding with that in the hose. There may be in-
troduced into the end of the shaft a tube with valves and piston or
a forcing air pump or something in the form of a bellows which do
not revolve with the cylinder. The tube or hose of the bellows may
pass into the end of the shaft in a boxing of soft leather or cork
to make an airtight joint and the shaft revolve while they are sta-
tionary. This will facilitate the necessary object of keeping a fresh
current of air to the person within the dress at any depth of water 8255x and while descending and ascending. When this dress is used in
situations exposed to Sharks &c. a coarse wire grating in the form of a
bell may be used and suspend near the bottom so as to be moved ~~[illegible]~~
~~to be moved~~ by the diver at pleasure. Trusses about the body may be
used to prevent the pressure of the water being injurious. a man in
this dress can descend to a great depth and remain there for six hours
or more enter the cabin or hold of vessels which are sunk, walk
about upon the bottom make rigging fast to whatever is to be raised
handle a bar of iron to considerable advantage converse with those at the
surface by putting their ear near the discharging hose and speaking
in the same and place rocks lowered down for the foundation of abut-
ments of bridges &c — Lamps may be used under water by the operator
by making use of this hose the refresher entering the bottom of a glass
cylinder the other hose the top. — A Lamp placed in the head dress
or cap will cause a brisk circulation of air through the Hose.

Witness
[illegible] B. Marrow
George Billinghouse

Leonard Norcross

Drawing
(Patented 14 June 1834)

1092 [illegible]